United States Patent [19]
Rueb

[11] Patent Number: 5,311,974
[45] Date of Patent: May 17, 1994

[54] VALVE ARRANGEMENT FOR A HYDRAULIC TRANSMISSION CIRCUIT

[75] Inventor: Winfried Rueb, Neustadt/Main, Fed. Rep. of Germany

[73] Assignee: Mannesmann Rexroth GmbH, Lohr/Main, Fed. Rep. of Germany

[21] Appl. No.: 819,972

[22] Filed: Jan. 13, 1992

[30] Foreign Application Priority Data

Jan. 11, 1991 [DE] Fed. Rep. of Germany ....... 4100672

[51] Int. Cl.[5] ...................... F16H 59/56; F16D 25/14
[52] U.S. Cl. ................................. 192/3.57; 192/3.63; 192/85 R; 192/87.13
[58] Field of Search ................... 192/3.57, 3.63, 85 R, 192/109 F, 87.13

[56] References Cited

U.S. PATENT DOCUMENTS

| 3,596,536 | 8/1971 | Starling ...................... 192/109 F X |
| 3,709,065 | 1/1973 | Starling ...................... 192/109 F X |
| 4,036,342 | 7/1977 | Finn . |
| 4,093,051 | 6/1978 | Kreitzberg . |
| 4,293,059 | 10/1981 | Lucas . |
| 4,396,099 | 8/1983 | Shirley ...................... 192/3.57 |
| 4,579,200 | 4/1986 | Murakami et al. . |
| 4,650,048 | 3/1987 | Gregerson et al. ............... 192/3.57 |
| 4,651,858 | 3/1987 | Horsch ........................ 192/87.13 |
| 4,795,017 | 1/1989 | Muncke ....................... 192/3.57 |
| 4,865,176 | 9/1989 | Blake et al. . |

FOREIGN PATENT DOCUMENTS 0059968 9/1982 European Pat. Off. .

Primary Examiner—Richard M. Lorence
Attorney, Agent, or Firm—Oblon, Spivak, McClelland, Maier & Neustadt

[57] ABSTRACT

A valve arrangement for a hydraulic transmission circuit, in particular for a change-under-load transmission with a clutch valve arrangement for controlling at least one clutch and/or start-up clutch with the aid of a pressure-regulating valve whose normal position can be influenced mechanically by a clutch pedal. The pressure-measuring area of the pressureregulating valve is connected to a control valve whose piston, acted on by the clutch pedal, can be brought, against the force of a spring placed between the pressure-regulating valve and the control valve, first of all out of a position that relieves the pressure-measuring area of load into a floating position in which the pressure-measuring area is connected to the pressure-regulating valve outlet. Then, and after traversing a certain path, it can be brought into contact with the valve body of the pressure-regulating valve. Here the valve body is slaved and is kept in a position in which the pressure-regulating valve outlet is connected by as large a cross-section as possible to the tank connection. The pressure-regulating valve includes a position and a control area which acts in opposition to a force on the pressure-measuring area. A second spring acts on the control area without utilizing a pressure tight chamber. The arrangement can be simply supplemented by a start safety valve that is connected in parallel to the pressure-regulating valve and to the safety valve and that can be brought, exclusively by mechanical action when moving the piston, acted on by the clutch pedal, out of an initial position blocking a neutral shift position valve in the neutral position into an unblocking position in which the neutral shift position valve can be unblocked.

18 Claims, 5 Drawing Sheets

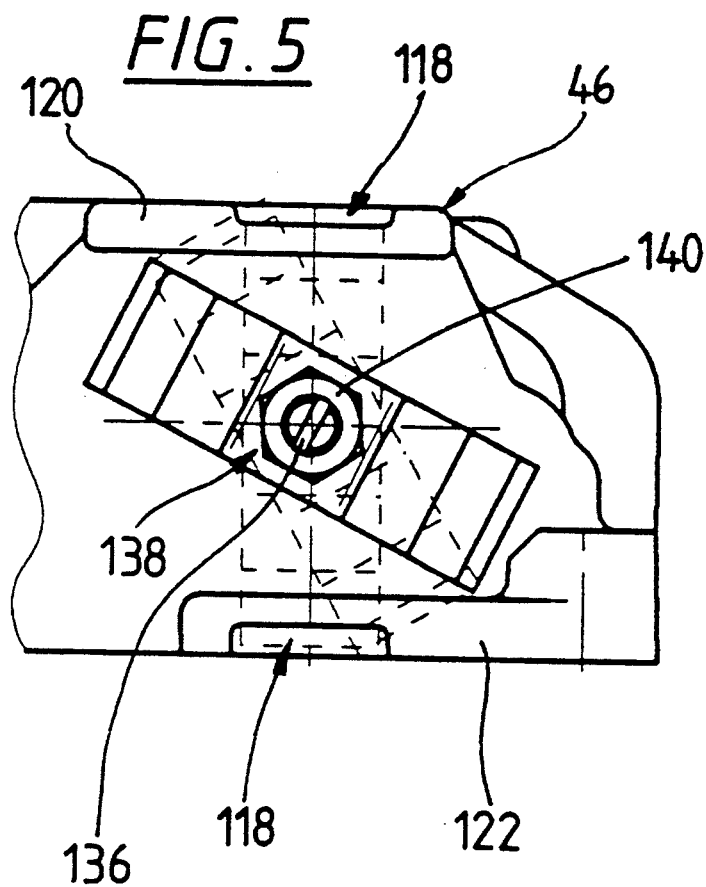

VALVE ARRANGEMENT FOR A HYDRAULIC TRANSMISSION CIRCUIT

BACKGROUND OF THE INVENTION

1. Field of the Invention

The invention relates to a valve arrangement for a hydraulic transmission circuit with a clutch valve arrangement for controlling at least one clutch and/or start-up clutch.

2. Discussion of the Background

A valve arrangement is known from U.S. Pat. No. 4,293,059. Here a pressure-regulating valve designated as an "inching valve" is used to control various transmission brakes and clutches. The governing spring is braced so that the characteristic line depends directly on the clutch pedal position. When the pedal is fully depressed, the "inching valve" connects the clutches to the reservoir and the transmission brake to system pressure, but this valve operation occurs in a way purely dependent on spring force, i.e., by changing the force of the governing spring A similar valve arrangement is shown in U.S. Pat. No. 4,093,051. Here a valve plunger is provided that can be pressed against a clutch pedal under the effect of a spring braced on the regulating valve piston. When the clutch pedal is released, this plunger presses the regulating piston to full output. When the pedal is depressed, the regulating piston reacts to the spring and pressure forces acting on it.

These known valve arrangements no longer sufficiently meet safety requirements, which have meanwhile become more strict, for transmission control valves. Especially when such a valve arrangement is used to control start-up clutches, it is guaranteed that there are maximum safety margins when the vehicle is started and driven off. Here the following requirements are to be fulfilled:

When the vehicle is started, the start-up clutch, which is generally constructed as a multiple-disk clutch that can be closed by pressure, is to be controlled by regulated pressure. Simultaneously, when the clutch pedal is fully depressed, it is certain that the start-up clutch is evacuated automatically and as quickly as possible When the clutch pedal is released, finally the intake of the pressure-regulating valve is opened so wide that slipping of the clutches, even taking into account differing leakage rates in the area of the individual clutches, is precluded. Finally, the arrangement is to be made so that, with slight structural changes, it is possible to provide additional safety functions, such as, e.g., protection against an unintentional, sudden driving off of the vehicle (i.e., a so-called "jump start"). Such a sudden, unexpected jump of the vehicle, such as, e.g., in an agricultural machine, occurs with conventional valve arrangements when, for example, the machine, having engine-starting problems, is started by short-circuiting the starter. In this case, the operator generally stands right in front of the large rear wheel of the vehicle. With mechanical transmissions, the danger to the operator during such an action is less than with change-under-load transmissions. If, namely, with mechanical transmissions, a gear is erroneously engaged due to inattention and then short-circuiting of the starter occurs, then the vehicle already begins to jerk with the first rotation of the starter and the starting process can be broken off. If, on the other hand, in change-under-load transmissions, a gear remains engaged, this state cannot be recognized right away. Rather, it generally takes a certain amount of time until the starting engine and the pump it drives have built up enough pressure to close the clutches. Then in any case the vehicle begins to move suddenly with a jump, greatly endangering the operator.

SUMMARY OF THE INVENTION

Thus the object of the invention is to provide a valve arrangement for a hydraulic transmission circuit that makes possible, when the clutch pedal is released and when it is fully depressed, definite positions of the control valve that are as invulnerable to disruptions as possible, while optimally meetings the above-mentioned safety aspect. A valve arrangement is provided that makes possible, in a simple manner, in combination with a safety circuit, a mechanism to prevent the above-mentioned "jump start."

According to the invention, it is assured that when the pedal is released, the pressure-regulating valve connects input and output without throttling effect because no pressure force is applied to the pressure-measuring area of the valve and consequently the governing spring of the pressure-regulating valve can fully open the valve. When the pedal is halfway depressed, the pressure-regulating valve can still control the pressure, because a connection between the pressure-measuring area and the output of the pressure-regulating valve is produced by the shift valve. The amount of regulated pressure is determined by the position of the clutch pedal and thus also by the position of the shift valve, which in turn determines the spring force of the characteristic spring arrangement that is placed between the shift valve and the pressure-regulating valve.

When the pedal is fully depressed, the pressureregulating valve piston is mechanically slaved into a position in which the output of the pressure-regulating valve is connected to the tank as much as possible. In this manner it is assured that, independently of spring tolerances and motive forces in the clutches to be shifted, tank pressure is applied when the clutch pedal is depressed.

Consequently, when the clutch pedal is released, clearly allocated piston positions of the pressure-regulating valve result just as when the clutch pedal is fully depressed, and both shift positions are displacement-controlled by the clutch pedal position and consequently by the position of the shift valve. The valve arrangement thus makes available in this manner, for a prolonged period, completely safe shift positions.

Further, the design of the valve arrangement according to the invention opens the possibility of using the displacement control by moving the shift valve to protect against the socalled "jump start" of the vehicle.

By this operation it is assured that the transmission control valve remains blocked after starting the engine until it is brought, by a complete depression of the clutch pedal, into the unblocking position in which the neutral shift position valve can be unblocked.

An especially simple operation results when according to a further embodiment, the supply pressure or the system pressure has fallen, which is the case, for example, when the pump is stopped, the return spring pushes the safety valve into the position in which the spring side is connected by the valve to the supply pressure line. When, after starting the driving engine, the pump again generates pressure, the safety valve remains in this initial position, since the sum of the forces of the return spring and the pressure force on the first control pressure area is greater than the pressure force on the second control pressure area. In this position, the safety valve or the safety start valve still connects a control pressure line with system pressure that leads to the neutral shift position valve and blocks the latter in the neutral position Hydraulic unblocking of the safety valve is not possible The safety valve can first be pushed into the further shift position, in which the output line or the control pressure line controlled by the safety valve is connected to the reservoir, when the clutch pedal and thus the control valve is depressed by a predetermined path, preferably completely. Since the first control pressure area in this shift position also is relieved of its load to the reservoir, the safety valve snaps into the second shift position and again assumes the first shift position only when the system pressure decreases. These above-described measures guarantee that, even when the engine starting unit is misused, for example when the starter is short-circuited and when a gear is engaged, no danger of the vehicle possibly driving off occurs. Because of the above-described operation, the safety valve keeps the entire transmission control valve arrangement blocked until a driver has fully depressed the clutch pedal a first time.

To place the valve arrangement in as small a space as possible, it is advantageous to accommodate the control valve and the pressure-regulating valve coaxially with one another and preferably in one housing. To minimize the total length and the working length of the housing in this case, the characteristic spring arrangement is accommodated at least partially inside the shift valve piston.

When the connection of the shift valve leading to the pressure-measuring area of the pressure-regulating valve is offset in the peripheral and axial direction to the regulating pressure connection, these connections can be located relatively close to one another in the axial direction, thus enabling the total length to be additionally reduced.

Finally, the total length of the housing and thus also the length of the working areas can be reduced by placing the adjustable governing spring outside the valve housing.

An especially economical arrangement of the adjustable governing spring results with a further embodiment. In this embodiment, while spring cups with machined threads previously were used for the setscrew, and the spring cup was mounted on the housing by a snap ring or by fastening screws, all work on the housing is eliminated.

When the governing spring, according to one embodiment, is braced against a disk that is supported by a threaded rod that engages a nut that is positively braced on the flange of the U-shaped sheet-metal strip, all machining for the setscrew thread moreover is eliminated. Standard nuts can also be used, and suitable shaping of the strip already assures the position of the nut.

Outwardly-bent legs, hooklike on the ends, of the sheetmetal strip bent in U-shape result in an especially simple assembly of the governing spring. The entire spring assembly and installation is performed by a bayonet-lock-like rotation of the sheet-metal strip with the spring inserted on the valve housing. The corresponding opposite contour of the housing can already be taken into consideration during casting.

BRIEF DESCRIPTION OF THE DRAWINGS

A more complete appreciation of the invention and many of the attendant advantages thereof will be readily obtained as the same becomes better understood by reference to the following detailed description when considered in connection with the according drawings, wherein:

FIG. 5 is a view taken in the direction of arrow V in FIG. 4; and

DESCRIPTION OF THE PREFERRED EMBODIMENTS

Figure 1:
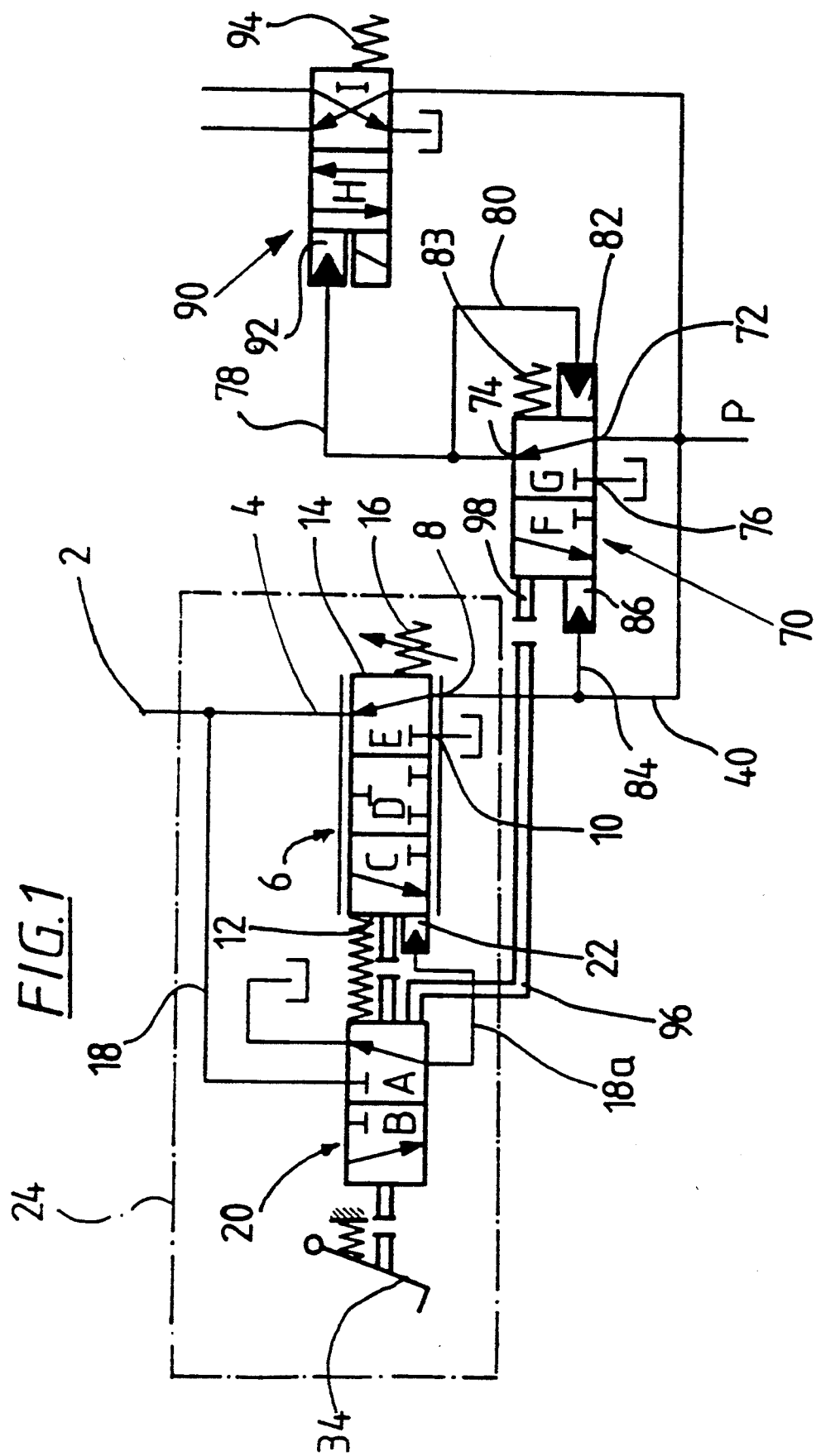
FIG. 1 shows a block diagram of the valve arrangement with an safety start function.

FIG. 1 shows a cutout of a hydraulic transmission circuit with a clutch valve arrangement for controlling at least one clutch and/or start-up clutch. The start-up clutches are not shown separately in FIG. 1. Control is performed by a service line 2 that is connected to an output 4 of a pressure-regulating valve 6.

Pressure-regulating valve 6 is made as a constantly adjustable three/three distributing valve with a system pressure connection 8, a reservoir connection 10 and a pressure regulating valve output 4.

Reference number 12 designates the pressure-measuring area of pressure/regulating valve 6 and reference number 14 designates the control area that acts in opposition to it and against which an adjustable governing spring 16 is braced without utilizing any pressure tight chamber. The feedback of the output pressure of the regulating valve in output 4 is performed by a pressure line 18 that is guided by a control valve 20. The section line between control valve 20 and a control part 22 of pressure-regulating valve 6 is designated 18a. Pressureregulating valve 6 and control valve 20 form a unit 24 that will be described below in greater detail based on FIG. 2.

Control valve 20 is a three/two distributing valve and has a control part connection 26, a reservoir connection 28 and a regulating pressure connection 30. Between pressure-regulating valve 6 and control valve 20 there is a characteristic spring arrangement 32, with which the piston of control valve 20 is prestressed in shift position A. The other shift position of control valve 20 is designated B. Control valve 20 can be pushed only mechanically, by operating a clutch pedal designated 34, out of shift position A into shift position B, in which tank connection 28 is blocked and pressure line sections 18 and 18a are connected to one another. In this shift position B, control part 22 of pressure-regulating valve 6 is consequently supplied with regulated output pressure in line section 4 so that pressure-regulating valve 6 can assume the pressure-regulating function.

The piston of pressure-regulating valve 6 moves to fulfill the pressure-regulating function between three shift positions C, D and E. Reference 36 designates a stop face which, when clutch pedal 34 is fully depressed, ensures that the piston valve of pressure-regulating valve 6 is pushed, displacement-controlled and slaved, into its shift position C and maintained there. For pressure-regulating valve 6, a stop extension 38 is indicated for this purpose. With the above-described design, the following mode of operation results:

When clutch pedal 34 is not operated, control valve 20 is pushed into position A, in which control part 22 is connected by section line 18a to tank connection 28. Pressure-regulating connection 30 is simultaneously closed, so that governing spring 16 pushes the regulating piston into shift position E, in which system pressure P is supplied through supply line 40 at its highest, i.e., with unthrottled pressure. The clutches and/or start-up clutches connected to lines 2 are fed in this manner with maximum working pressure, so that optimal safety against slipping of the clutches is provided, even taking differing leakages into consideration.

When clutch pedal 34 is depressed partially or halfway, pressure-regulating valve 6 controls since, in shift position B, pressure-measuring area 12 is connected by lines 18a, 18 to output 4. The amount of the controlled pressure is determined by the position of clutch pedal 34 and thus by the position of control valve 20, because the latter establishes the spring force of characteristic spring arrangement 32.

When the pedal is fully depressed, control valve 20 presses, by striking stop face 36 on stop extension 38, the piston of pressure-regulating valve 6 mechanically into shift position C, in which valve output 4 is connected by the largest possible surface to tank connection 10. In this manner it is assured, regardless of spring tolerances and friction forces, that when clutch pedal 34 is fully depressed, the lowest possible pressure, i.e., reservoir pressure, is applied to the clutches to be shifted.

Figure 2:
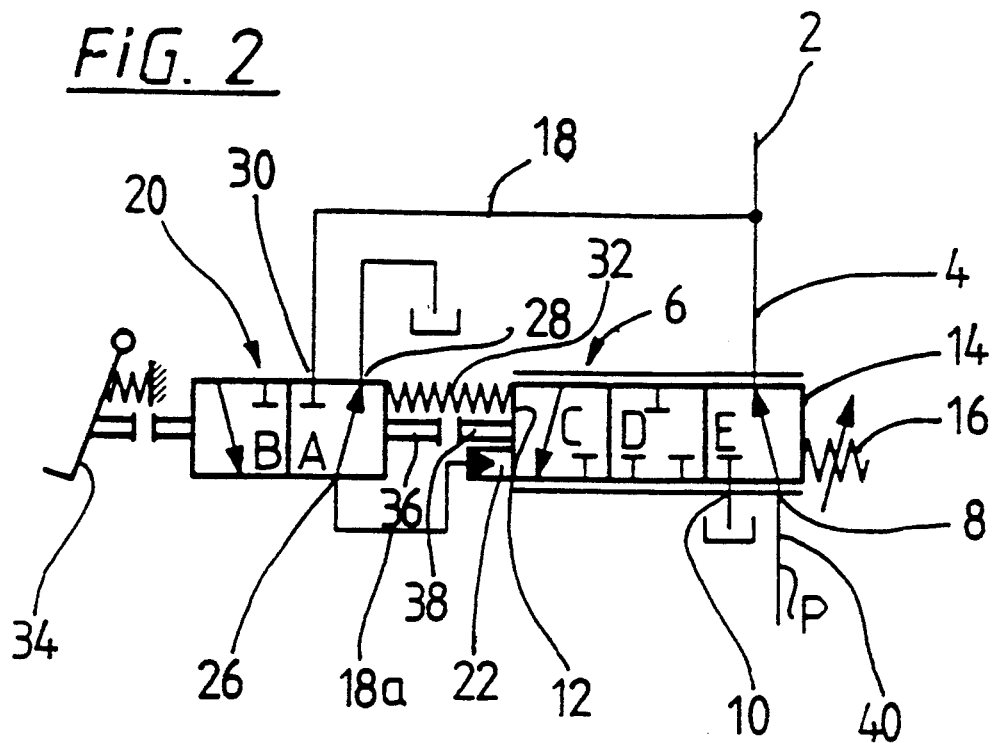
FIG. 2 illustrates the shift valve area and the regulating valve area of the valve arrangement according to FIG. 1.
Figure 3:
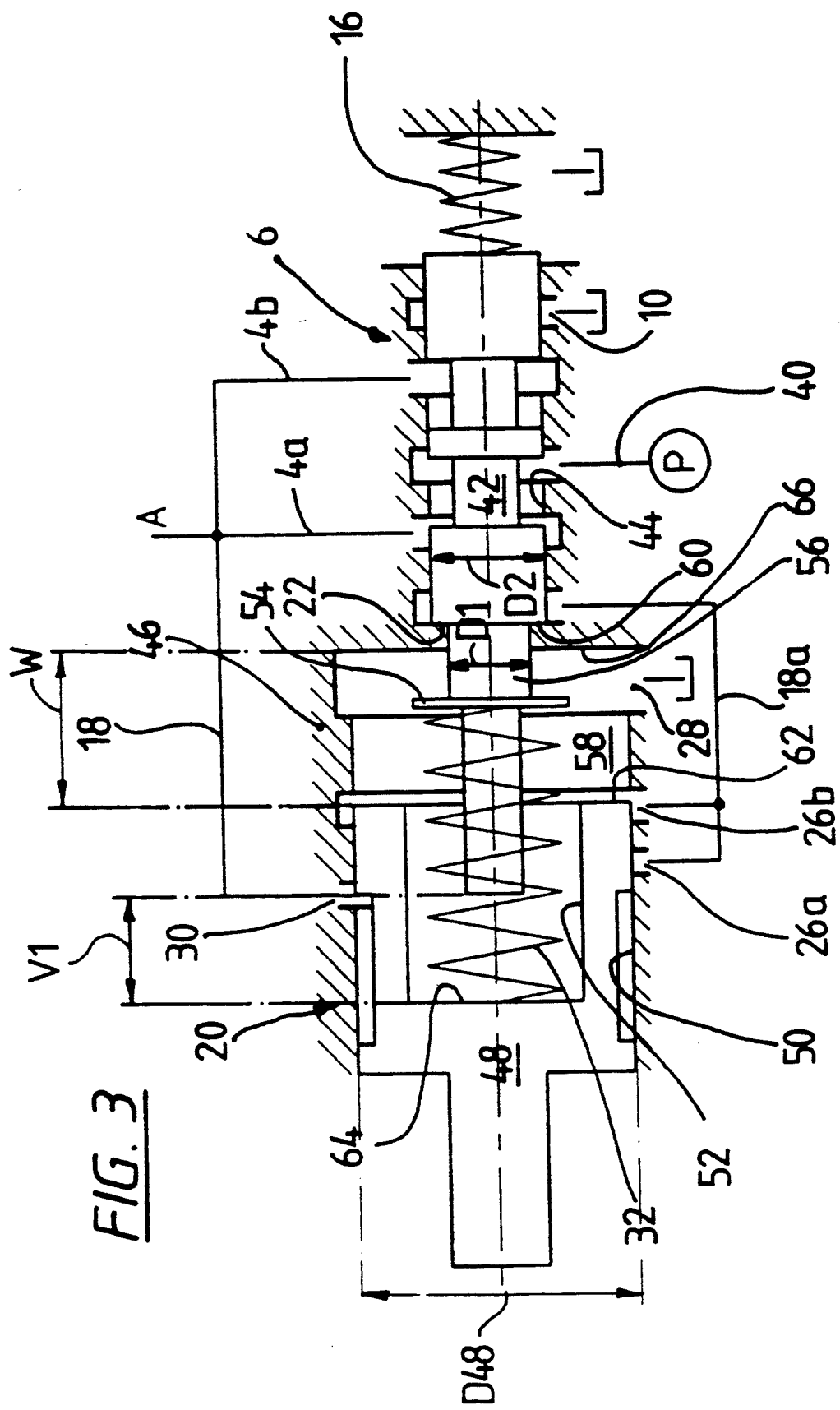
FIG. 3 shows a diagrammatic sectional view of a first embodiment of the shift valve area and of the pressure-regulating valve area according to FIG. 2.

FIG. 3 shows a possible embodiment of the valve arrangement according to FIG. 2. Those parts that correspond to the components of FIG. 2 have the same reference numbers but in a 100-series.

Pressure-regulating valve 6 exhibits a regulating piston 42 that is conveyed to slide into a bore 44 of a valve housing 46. For the sake of simplifying the description, the control edges are not shown in greater detail The connections explained above based on FIGS. 1 and 2 are designated by reference numbers 40, 10 and 4a, 4b, and the system pressure is put through line 4a and the clutch is relieved of its load by line branch 4b.

The valve piston of control valve 20 is designated by reference number 48. The latter is conveyed, coaxially to regulating valve piston 42 in the same housing 46, to slide into a bore 50. Bore 50 has a larger diameter than bore 44 so as to receive regulating piston 42. To reduce the total axial length of the valve arrangement, control valve piston 48 has, on the side facing regulating piston 42, an axial recess 52 in which a characteristic spring or characteristic spring arrangement 32 is accommodated. Characteristic spring 32 is braced, on the one hand, on the base of axial recess 52 and, on the other hand, on a disk shoulder 54 of a regulating piston extension 56, which projects, sealed, into an unpressurized valve chamber 58. The latter is relieved of its load by tank connection 28. Reference number 26a designates a first control part connection and reference number 26b designates a second control part connection whose function will be explained in greater detail hereinbelow.

FIG. 3 shows valve pistons 48, 42 when the clutch pedal is not depressed. Governing spring 16 presses regulating piston 42 against a shoulder 60 in valve housing 46. Characteristic spring arrangement 32 moves control valve piston 48 into a shift position in which regulating pressure connection 30 is separated from control part connection 26a, 26b. A connection is made by connection 26b between tank connection 28 and line section which leads to control part 22 in the form of a circular area with inner diameter D1 and outer diameter D2. Connections 30 and 26a are located so as to be offset in the axial direction and in the peripheral direction, in order to maintain the axial offset of the connections, and thus the total axial length of the valve group, as small as possible.

When the clutch pedal is operated, first connection 26b closes by control edge 62 so that the connection of section 18a to tank connection 28 is interrupted. With further movement, the connection between connection 30 and connection 26a opens, so that control piston 42 can assume the control function. In the area of a movement path V1, the pressure regulation is influenced. After traversing path of movement V1, area 64 strikes regulating piston extension 56 and slaves the latter until total path W is traversed and control edge 62 strikes housing shoulder 66. In this position, regulating piston 42 is moved so far to the right that line branch 4b is connected by as large an opening as possible to reservoir connection 10 and simultaneously system pressure connection 40 is blocked.

The above-described valve unit consisting of a control valve and a pressure-regulating valve advantageously opens the possibility of transferring to the valve arrangement another safety function to prevent the so-called "jump start" of vehicles with change-under-load transmissions. This additional safety function is realized in the hydraulic circuit according to FIG. 1 as follows:

Connected in parallel to pressure-regulating valve 6 and to control valve 20 is a start-safety valve 70 that is made as a three/two distributing valve and has a system pressure connection 72, a control pressure connection 74 and a tank connection 76. The discharge line of the start-safety valve is designated by reference numeral 78. A first control pressure line 80 that is conveyed to a first control area 82 of start-safety valve 70 starts from this line 78. A second control pressure line 84, which is conveyed to a second control area 86 that is smaller compared to first control area 82, branches off from supply line 40, supplied with system pressure, upstream from pressure-regulating valve 6. The shift positions of start-safety valve 70 are designated by G and F, and position G designates the safety position in which system pressure P is transmitted fully to discharge line 78. The latter leads to an operating element 92 of a neutral valve or of a neutral shift position valve 90 that is made as a four/two distributing valve and that can be moved, under the effect of system pressure in operating element 92 against the force of a return spring 94, from shift position I into shift position H, which represents the neutral position In this neutral position, the transmission of force from the change-under-load transmission to the driving wheels of the vehicle, for example of an agricultural utility vehicle, is not possible.

With the circuit according to FIG. 1, the following operation results:

When system pressure P is zero, which is the case with an idle pump, i.e., with an idle engine, valves 6, 20, 70 and 90 assume the position shown in FIG. 1. When the drive engine is started, the pump again generates pressure in system pressure line 40 and thus, also with connected start-safety valve 70, in discharge line 78 and in first control pressure line 80. Neutral shift position valve 90 is moved by operating element 92 into shift position H and is blocked in this neutral position.

It is true that the system pressure in system pressure line 40 is transmitted by second control pressure line 84 also to second control area 86 of the valve piston on start-safety valve 70. Nevertheless, this valve 70 remains in initial position G when the system pressure, which is, e.g., about 18 bars, is building up, since first control area 82 is larger than second control area 86 and, further, the force of a return spring 83 according to FIG. 1 is prestressed to the left.

Start-safety valve 70 can be unblocked only mechanically by the movement of control valve 20. This is indicated diagrammatically in FIG. 1 by reference numbers 96 and 98, which designate the mechanical final control elements. When clutch pedal 34 is depressed, final control element 96, connected to the control valve piston, slaves final control element 98 on the piston of start-safety valve 70 and moves the latter, displacement-controlled, into unblocking position F, in which system pressure connection 72 is blocked and line sections 78 and 80, and thus also first control area 82, are relieved of load. Since, by relieving the load of discharge line 78, operating element 92 of neutral shift position valve 90 also is relieved of load, the latter can be moved into shift position I, i.e., out of the neutral position. Since the vehicle equipped with the change-under-load transmission can be put into motion only then, the danger of a possible, so-called "jump start" of the vehicle is reliably eliminated, since, beforehand, the driver of the vehicle must for the first time fully depress the clutch pedal.

Because of the supply of system pressure to second control area 86, start-safety valve 70 remains in the unblocked position until the system pressure decreases, after the engine is shut off, to the point that the force on the part of second control area 86 is overcome by return spring 83. The valves then again assume the initial position shown in FIG. 1.

Figure 6:
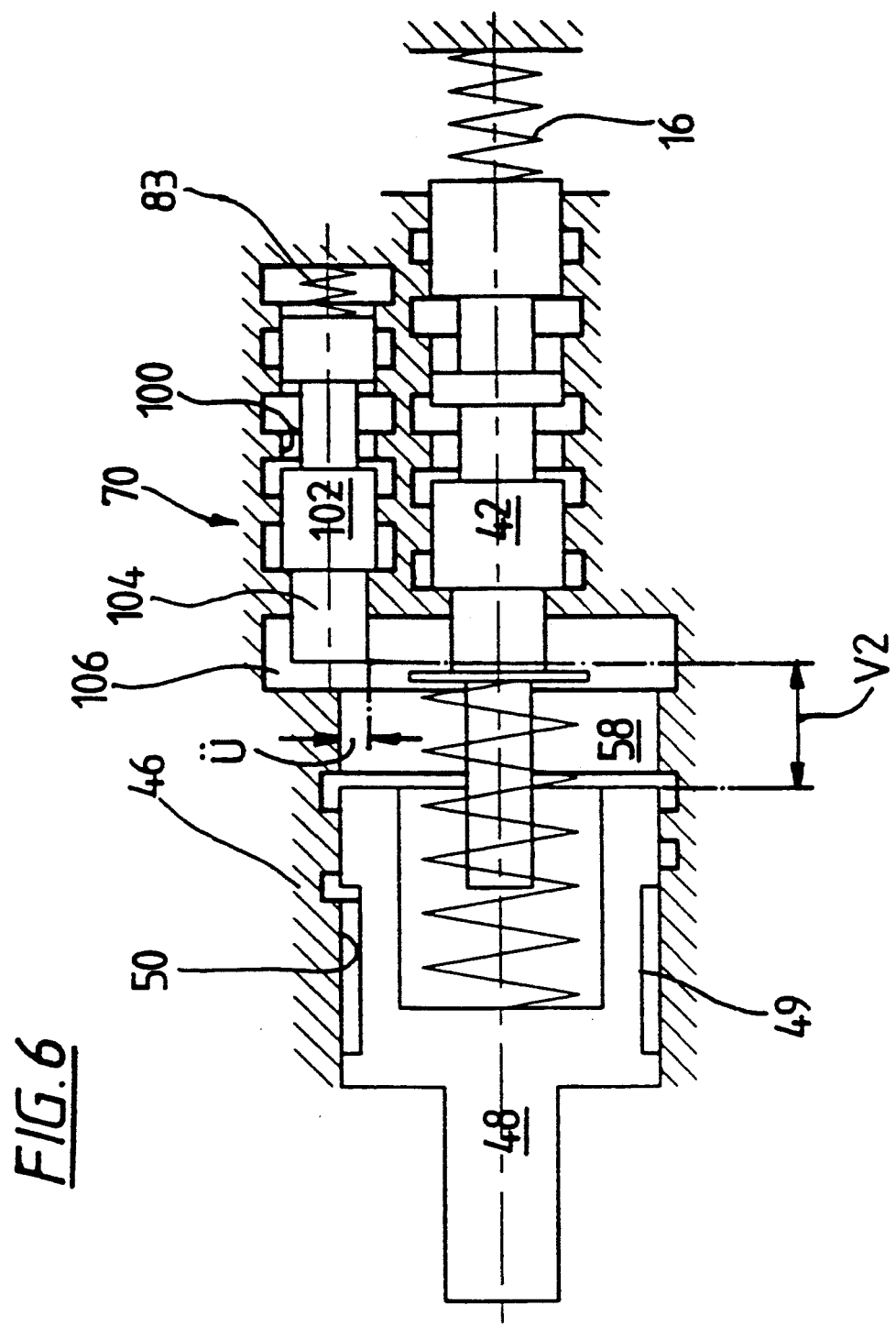
FIG. 6 is a diagrammatic sectional view taken through a valve housing in which the valve arrangement according to FIG. 1 is placed.

FIG. 6 shows a diagrammatic view of a section of a valve housing in which the entire valve arrangement of the circuit is accommodated according to FIG. 1. With respect to pressure-regulating valve 6 and to control valve 20, this embodiment does not differ from that according to FIG. 3, so that a detailed description of these parts can be dispensed with. For further simplification of the presentation, the connection and control pressure lines, as well as neutral shift position valve 90, have been omitted.

Valve housing 46 exhibits a valve bore 100 that is parallel to the axis of bore 44 and in which a valve piston 102 with control edges, not shown in greater detail, can be slidably conveyed. Valve piston 102 has a piston extension 104 that is reduced in diameter and extends, sealed, into a valve chamber expansion 106. Shift position G of start-safety valve 70 is shown, which is defined by spring 83 and a stop in the transition to piston extension 104. The arrangement is made so that the cross section of piston extension 104 extends into the area of bore 50, and the extent of overlap is designated by U. By moving control valve piston 48, valve piston 102 consequently can, after traversing a predetermined movement path V2, be slaved and be moved rightward into shift position F, i.e., into the unblocking position.

Figure 4:
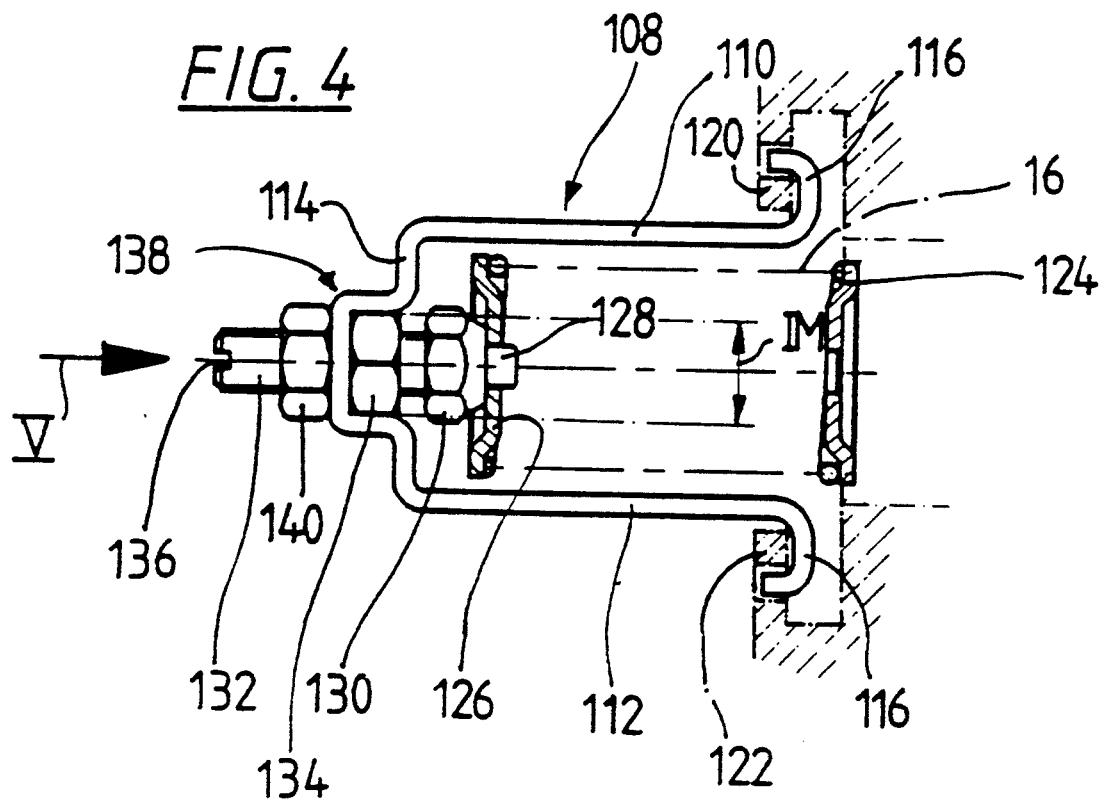
FIG. 4 illustrates a diagrammatic side view of a mounting for an adjustable governing spring of the pressure-regulating valve according to FIGS. 1 to 3.

To keep the total axial length of the valve and the working length in housing 46 as small as possible despite the series connection of valve pistons 48 and 42, besides the above-described arrangement of connections 26a and 30, offset in the peripheral direction, with the help of a recess 49 in control valve piston 48, the additional measure is taken of placing adjustable governing spring 16 outside valve housing 46. This will be explained in greater detail below when discussing FIGS. 4 and 5:

A striplike molded part 108, which essentially has the shape of a U with legs 110 and 112, is used to receive governing spring 16. The flange is designated 114. In the embodiment shown, the molded part is made from a sheet metal strip bent in a U-shape whose legs 110, 112 are long enough to receive governing spring 16 inside it. On the ends, legs 112 are bent, hook-shaped, outward, producing interlocking sections 116. The latter engage, in the assembled state, molded recesses 118 that are formed on valve housing 46 in the area of opposite reinforcing ribs 120, 122.

The assembly of adjustable governing spring 16 is performed by a kind of bayonet lock, i.e., by threading molded part 108 like a bayonet lock between reinforcement ribs 120, 122 and, after being twisted with interlocking sections 116, 118, being brought into positive engagement with molded recesses 118. This engagement is indicated diagrammatically in FIG. 4 by the dot-dash sketch of the housing. The governing spring is braced on the side of the interlocking sections by a disk 124 on regulating piston 42, not shown, and, on the opposite side, on another support disk 126, whose axial position inside molded part 108 can be changed as follows to adjust the regulating characteristic:

Support disk 126 has, going through it in the center, a pivot pin 128 that is located on a specially configured cap nut 130. The cap nut is screwed onto a threaded pin 132 that is engaged in a nut 134 and extends through flange 114 outward. On the outer end, threaded pin 132 has an adjustable slot 136.

Nut 134 is fixed positively, and thus in a torsionresistant manner, on flange 114 by providing, in the area of flange 114, a bulge 138 with an inside width dimension IM over flats of associated nut 134. A counter nut 140 is braced on the flat bottom of bulge 138.

To adjust the governing spring characteristic, only counter nut 140 need be loosened. With the aid of adjustable slot 136, threaded pin 132 can be twisted and thus support disk 126 can be moved in the axial direction. After the adjustment is completed, counter nut 140 is again tightened and the adjustment is secured.

Of course the above-described governing spring mounting can also be used for other valves and valve arrangements, when it is important to keep the assembly and processing costs as small as possible.

The invention thus provides a valve arrangement for a hydraulic transmission circuit, in particular for change-under-load transmissions with a clutch valve arrangement for controlling at least one clutch and/or start-up clutch with the aid of a pressure-regulating valve whose normal position can be influenced mechanically by a clutch pedal. To assure an automatic and rapid evacuation of the start-up clutch when the clutch pedal is fully depressed and to achieve as much safety as possible against the clutch slipping when the pedal is released, the pressure-measuring area of the pressure-regulating valve is connected to a control valve whose piston, acted on by the clutch pedal, can be moved against the force of a characteristic spring arrangement placed between the pressure-regulating valve and the control valve first from a position in which the pressure-measuring area is relieved of load into a floating position in which the pressure-measuring area is connected to the pressure-regulating valve outlet, and consequently, after traversing a certain path, can be brought into contact with the valve body of the pressure-regulating valve. Here the valve body is slaved and is kept in a position in which the pressure-regulating valve outlet is connected by as large a cross-section as possible to the tank connection. This arrangement has the special advantage that it can be easily supplemented by a start-safety valve that is connected in parallel with the pressure-regulating valve and with the safety valve and can be brought exclusively by mechanical action, upon movement of the piston acted on by the clutch pedal, from an initial position that blocks a neutral shift position valve in the neutral position into an unblocking position in which the neutral shift position valve can be unblocked In this way the phenomenon of a so-called "jump start" of the vehicle equipped with the change-underload transmission is successfully precluded.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A valve arrangement for a hydraulic transmission circuit with a clutch valve arrangement for controlling at least one of a clutch and start-up clutch with the aid of a pressure-regulating valve, the position of which can be influenced mechanically by a clutch pedal, which comprises:
   a pressure regulating valve outlet;
   a reservoir;
   a control valve which includes a piston;
   a pressure-regulating valve having a piston which is shiftably guide din a receiving bore, a valve body, a pressure-measuring area and a control area;
   a first spring located between the pressure-regulating valve and the control valve wherein the piston of the control valve, w hen acted on by the clutch pedal, is movable against the force of the first spring first of all from a position in which the pressure-measuring area is relieved of load into a floating position in which the pressure-measuring area is connected to said pressure-regulating valve outlet, and subsequently, after traversing a predetermined path, is brought into contact with the valve body of the pressureregulating valve to keep the latter, by slaving the valve body, into a position in which said pressure-regulating valve outlet is connected to the reservoir; and
   a second spring which acts on said control area, in opposition to a force acting on said pressure measuring area, without utilizing a pressure tight chamber wherein said second spring is disposed outside said receiving bore for said pressure-regulating valve and wherein said first and second springs counteract each other and both act as governing springs for the pressure-regulating valve.

2. A valve arrangement according to claim 1, wherein a safety valve is connected in parallel to said control valve and said pressure-regulating valve, and wherein said safety valve is brought, exclusively by mechanical action upon movement of said piston, acted on by the clutch pedal, from an initial position that blocks a neutral shift position valve in a neutral position into an unblocking position in which the neutral shift position valve is unblocked.

3. A valve arrangement according to claim 1, which comprises an adjustable governing spring wherein said pressure-regulating valve comprises a constantly adjustable three/three distributing valve having a valve body acted on by said adjustable governing spring on a side facing away from said pressure-measuring area.

4. A valve arrangement according to claim 2, which comprises a discharge line and a supply pressure connection wherein said safety valve comprises a piston valve which, by the force of a return spring and by connection with supply pressure acting on a first control pressure area in a discharge line of said safety valve against the force of a supply pressure acting on a second control pressure area upstream from said pressure-regulating valve, is maintained in an initial position until, by moving said control valve, a piston valve is slaved and is brought into an unblocking position in which said discharge line is connected to said reservoir and said supply pressure connection is blocked.

5. A valve arrangement according to claim 4, wherein said safety valve is brought from said initial position into said unblocking position only in a fully depressed position of said clutch pedal.

6. A valve arrangement according to claim 3, wherein the control valve includes a control valve piston and is placed substantially coaxial to said pressure-regulating valve and the slaving of pressure valve body is performed by contact with said control valve piston.

7. A valve arrangement according to claim 1, wherein a connection of said control valve leading to said pressuremeasuring area of said pressure-regulating valve is offset in the peripheral direction and axially to a regulating pressure connection.

8. A valve arrangement according to claim 6, which comprises a housing wherein the piston of said pressureregulating valve and valve body of said control valve are positioned in said housing.

9. A valve arrangement according to claim 1, which comprises a spring arrangement located at least partially inside said control valve piston.

10. A valve arrangement according to claim 6, wherein said piston of said control valve has a larger diameter than said valve body of said pressure-regulating valve.

11. A valve arrangement in particular according to claim 8, wherein said adjustable governing spring is located outside said valve housing.

12. A valve arrangement according to claim 11, wherein an adjustable governing spring is located in a sheet metal strip of a substantially U-shape with legs bent outward and on the ends of which hooks are formed for interacting with opposite reinforcement areas on said valve housing.

13. A valve arrangement according to claim 12, wherein said governing spring is braced on a disk that is supported by a threaded pin that is engaged with a nut that is positively braced on a flange of said U-shaped sheet metal strip.

14. A valve arrangement according to claim 13, wherein said legs have ends bent outwardly for interlocking with corresponding recesses formed in the housing.

15. A valve arrangement according to claim 4, which comprises a pressure-relieving valve chamber wherein said piston valve of said safety valve has an axis parallel to pressure-regulating valve and projects into said pressurerelieving valve chamber within in which said spring is also located.

16. A valve arrangement according to claim 4, wherein a second control pressure area of said safety valve is predetermined so as to be so large that the supply pressure overcomes the force of the return spring when said first control pressure area is relieved of load.

17. A valve arrangement according to claim 2, which comprises an adjustable governing spring wherein said pressure-regulating valve comprises a constantly adjustable three/three distributing valve whose valve body is acted on by said adjustable governing spring on a side facing away from said pressure-measuring area.

18. A valve arrangement according to claim 3, which comprises a discharge line and a supply pressure connection wherein said safety valve comprises a piston valve which, by the force of a return spring and by connection with supply pressure acting on a first control pressure area in a discharge line of said safety valve against the force of a supply pressure acting on a second control pressure area upstream from said pressure-regulating valve, is kept in initial position until, by moving said control valve, a piston valve is slaved and is brought into an unblocking position in which said discharge line is connected to said reservoir and said supply pressure connection is blocked.

* * * * *

UNITED STATES PATENT AND TRADEMARK OFFICE
CERTIFICATE OF CORRECTION

PATENT NO. : 5,311,974                    Page 1 of 2
DATED      : MAY 17, 1994
INVENTOR(S): Winfried RUEB It is certified that error appears in the above-indentified patent and that said Letters Patent is hereby corrected as shown below:

In the Abstract, line 7, delete "pressureregulating" and insert --pressure-regulating--.
    Column 1, line 45, after "possible" insert --.--.
    Column 2, line 14, delete "meetings" and insert --meeting--.
    Column 2, lines 36-37, delete "pressureregulating" and insert --pressure-regulating--.
    Column 2, line 55, delete "socalled" and insert --so-called--.
    Column 3, line 8, after "position" insert --.--.
    Column 3, line 9, after "possible" insert --.--.
    Column 3, line 62, delete "sheetmetal" and insert --sheet-metal--.
    Column 4, lines 47-48, delete "pressureregulating" and insert
        c_        -  ----il" insert --.--.
    Column 6, line 61, after "position" insert --.--.
    Column 9, line 20, after "unblocked" insert --.--.

UNITED STATES PATENT AND TRADEMARK OFFICE
CERTIFICATE OF CORRECTION

PATENT NO. : 5,311,974
DATED : MAY 17, 1994
INVENTOR(S) : Winfried RUEB

It is certified that error appears in the above-indentified patent and that said Letters Patent is hereby corrected as shown below:

Column 9, line 45, delete "w hen" and insert --when--.
Column 9, line 53, delete "pressureregulating" and insert --pressure-regulating--.

Column 10, line 1, after "piston" insert --of said piston regulating valve--.
Column 10, line 6, delete "which" and insert --wherein said second spring--.
Column 10, line 41, delete "pressureregulating" and insert --pressure-regulating--.

Signed and Sealed this

Seventh Day of November, 1995

Attest:

BRUCE LEHMAN

*Attesting Officer*   *Commissioner of Patents and Trademarks*

UNITED STATES PATENT AND TRADEMARK OFFICE
CERTIFICATE OF CORRECTION

PATENT NO. : 5,311,974
DATED : MAY 17, 1994
INVENTOR(S) : Winfried RUEB

It is certified that error appears in the above-indentified patent and that said Letters Patent is hereby corrected as shown below:

Column 5, line 46, after "detail" insert --.--.

Signed and Sealed this

Second Day of July, 1996

Attest:

Attesting Officer

BRUCE LEHMAN

Commissioner of Patents and Trademarks